UNITED STATES PATENT OFFICE.

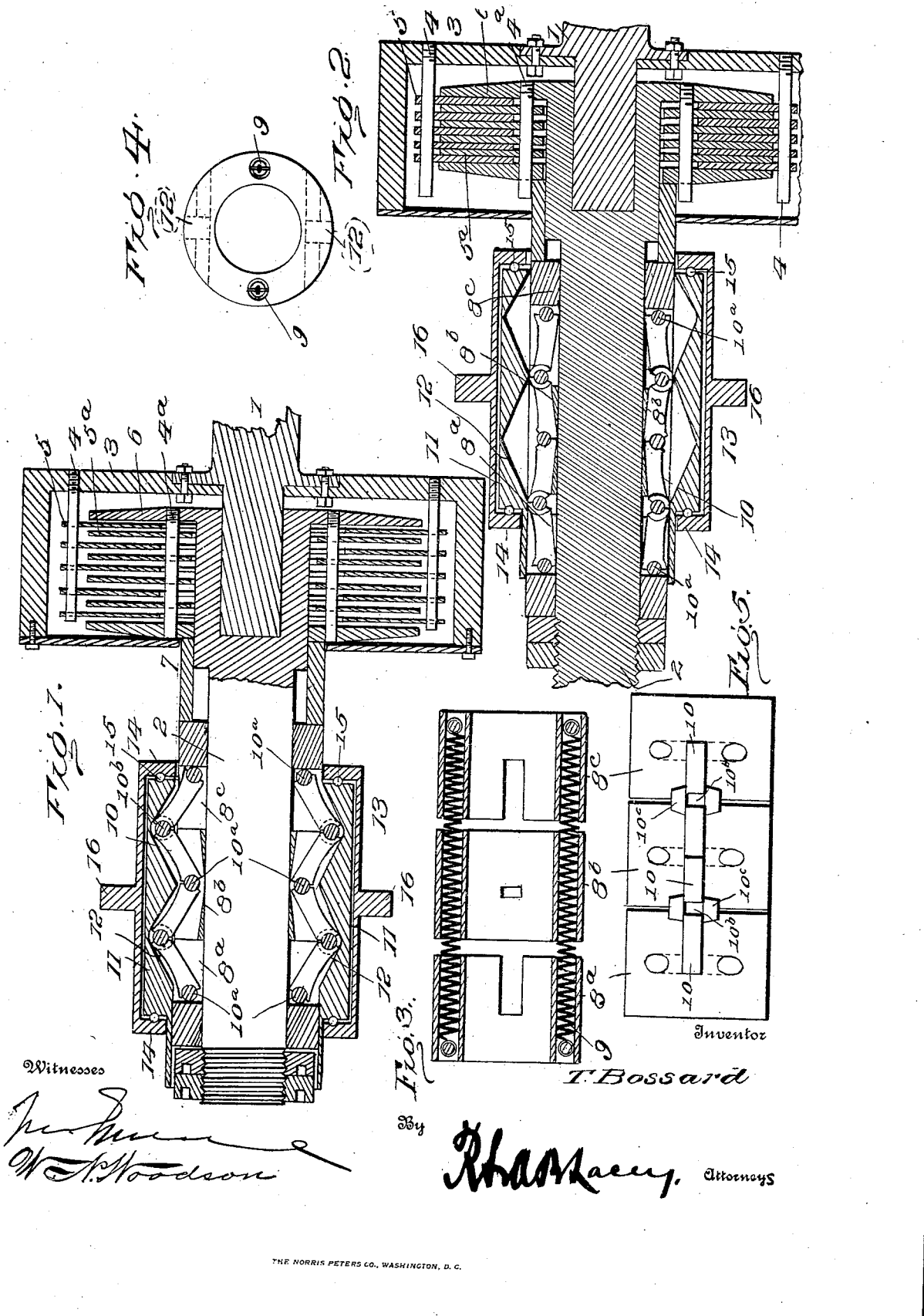

THEODORE BOSSARD, OF SALT LAKE CITY, UTAH, ASSIGNOR TO STANDARD DEVELOPMENT COMPANY, OF SALT LAKE CITY, UTAH, A CORPORATION.

CLUTCH MECHANISM.

No. 910,353.  Specification of Letters Patent.  Patented Jan. 19, 1909.

Application filed March 28, 1908. Serial No. 423,947.

*To all whom it may concern:*

Be it known that I, THEODORE BOSSARD, citizen of Switzerland, residing at Salt Lake City, in the county of Salt Lake and State of Utah, have invented certain new and useful Improvements in Clutch Mechanisms, of which the following is a specification.

The present invention relates to improvements in clutches, and has for its object to provide a novel construction whereby the coöperating clutch members can be rigidly locked in engagement with each other by the application of a comparatively small amount of force upon the controlling lever.

The invention further contemplates a clutch mechanism in which the members are gradually forced into contact with each other, thereby preventing sudden application of power which would produce undue wear and tear upon the machinery and is exceedingly detrimental to the life of the engine.

For a full description of the invention and the merits thereof and also to acquire a knowledge of the details of construction and the means for effecting the result, reference is to be had to the following description and accompanying drawings, in which:

Figure 1 is a vertical longitudinal sectional view through a clutch actuating mechanism embodying the invention, the friction plates of the clutch being out of engagement with each other. Fig. 2 is a similar view showing the device in an operative position with the plates of the clutch in frictional engagement with each other. Fig. 3 is a horizontal sectional view through the rings of the clutch actuating mechanism. Fig. 4 is an end view of one of the rings. Fig. 5 is a top plan view of the rings and the toggle levers between the rings.

Corresponding and like parts are referred to in the following description and indicated in all the views of the drawings by the same reference characters.

Referring to the drawing the numerals 1 and 2 designate a pair of shafts which are arranged in alinement with each other, one of the shafts being continually rotated by any suitable means and a clutch mechanism being provided whereby the two shafts can be locked together so as to rotate in unison or may be released from engagement with each other as desired. The shaft 1 is provided with a clutch member 3 carrying the pins 4 upon which a plurality of friction plates 5 are loosely mounted. In a similar manner the opposite shaft 2 carries a coöperating clutch member 6 comprising pins $4^a$ upon which friction plates $5^a$ are loosely mounted, the friction plates of one of the clutch members being disposed between the corresponding friction plates of the opposite clutch member. It will thus be apparent that when these plates 5 and $5^a$ are forced into a frictional engagement with each other the two clutch members will be locked together and the shafts 1 and 2 will rotate in unison. However when these friction plates are released and permitted to spread apart the two shafts have no positive connection and the driving shaft continues to rotate while the driven shaft remains stationary. In the present instance the friction plates are controlled by a sleeve 7 which is slidably mounted upon the shaft 2 and is controlled through the medium of a plurality of rings and toggle levers as will be hereinafter described. These rings are designated by the reference characters $8^a$, $8^b$ and $8^c$, the outermost ring $8^a$ being rigid with the shaft 2 while the remaining two rings slide freely upon the shaft, the innermost ring $8^c$ engaging the sleeve 7. Tension springs 9 are utilized for normally drawing the rings together and holding them in engagement with each other, the said springs being housed within longitudinal recesses formed in the rings. Opposite sides of the adjacent rings are provided with toggle levers 10 which project outwardly at an angle to each other when the rings are drawn into contact with each other by means of the springs 9. The inner ends of the toggle levers 10 are formed with depressions which loosely receive transverse pins $10^a$ carried by the various rings, while the outer ends of the levers are similarly recessed and bear loosely against pins $10^b$. The extremities of these pins $10^b$ project laterally upon opposite sides of the levers and have the rollers $10^c$ journaled thereon. It will be entirely obvious however that by forcing the toggle levers 10 inwardly into alinement with each other the various rings will be spread apart and the end ring $8^c$ will coöperate with the sleeve 7 to move the plates 5 and $5^a$ of the clutch members into a frictional engagement with each other. Slidably mounted upon the exterior of the rings is a collar 11 provided upon its interior with the recesses 12 designed to receive the toggle levers 10 when the same project outwardly at an angle to each other and the rings 8ª, 8ᵇ and 8ᶜ are drawn together.

Attention is directed to the fact that the end walls of the recesses 12 are inclined outwardly in opposite directions and are designed to have a cam action upon the rollers 10ᶜ when the collar is moved longitudinally. A tubular casing 13 incloses the collar or slide 11 and is provided with end flanges 14 fitting over shoulders at opposite ends of the collar or slide. For the purpose of reducing the friction due to end thrust it may be found desirable to interpose anti-friction bearings 15 between the end flanges 14 and the collar. Projecting laterally from opposite sides of the tubular casing 13 are the studs 16 which are designed to engage a shipper lever of any approved construction.

In the normal position of the parts the rings 8ª, 8ᵇ and 8ᶜ are drawn together by the springs 9 and the two sets of toggle levers 10 project outwardly within the recesses 12 of the collar or slide 11. When the collar or slide 11 is moved longitudinally through the medium of the shipper lever the inclined end walls of the recesses 12 in the collar have a cam action upon the rollers 10ᶜ and tend to force the levers 10 inwardly into alinement with each other, thereby spreading the rings 8ª, 8ᵇ and 8ᶜ apart and operating through the sleeve 7 to throw the clutch members into coöperative relation with each other.

Having thus described the invention, what is claimed as new is:

1. The combination of a driving member, a driven member adapted to receive motion from the driving member, a clutch mechanism between the two members, a plurality of rings mounted upon one of the members and having an operative connection with the clutch mechanism, toggle levers connecting the rings, a roller carried by the toggle levers at their junction, a collar loosely receiving the rings and toggle levers and formed with cam portions adapted to engage the roller for controlling the toggle levers, and means for moving the collar to actuate the clutch mechanism.

2. The combination of a driving member, a driven member, a clutch mechanism therefor, a plurality of rings mounted upon one of the members and having an operative connection with the clutch mechanism, toggle levers connecting the rings, a roller carried by the toggle levers, and a collar loosely receiving the rings and provided with a recess for the reception of the toggle levers, the walls of the recess being adapted to engage the roller for controlling the toggle levers.

3. The combination of a driving member, a driven member, a clutch mechanism therefor, a plurality of rings upon one of the members and having an operative connection with the clutch mechanism, toggle levers connecting the rings, a collar loosely receiving the rings and provided with recesses for the reception of the toggle levers, the said recesses having inclined walls adapted to have a cam action upon the toggle levers, and means for moving the collar to control the clutch mechanism.

4. The combination of a driving member, a driven member, a clutch mechanism therefor, a plurality of rings upon one of the members and having an operative connection with the clutch mechanism, toggle levers connecting the rings, a pin between the outer ends of the toggle levers, a roller upon the pin, and a cam member engaging the roller for controlling the toggle levers.

5. The combination of a driving member, a driven member, a clutch mechanism therefor, a plurality of rings mounted upon one of the members and having an operative connection with the clutch mechanism, toggle levers connecting the rings, a collar loosely receiving the rings and coöperating with the toggle levers to control the clutch mechanism, and a tubular casing loosely mounted upon the collar for moving the same.

6. The combination of a driving member, a driven member, a clutch mechanism therefor, a plurality of rings mounted upon one of the members and having an operative connection with the clutch mechanism, toggle levers connecting the rings, a collar loosely receiving the rings and coöperating with the toggle levers to control the clutch mechanism, a tubular casing loosely mounted upon the collar and formed with end flanges, and anti-friction rollers interposed between the end flanges of the tubular casing and the collar.

In testimony whereof I affix my signature in presence of two witnesses.

THEODORE BOSSARD. [L. S.]

Witnesses:
F. MOORMEISTER,
WM. MORBEST.